United States Patent
Boch et al.

(10) Patent No.: US 8,881,790 B2
(45) Date of Patent: Nov. 11, 2014

(54) SHADING DEVICE FOR A GLAZED VEHICLE OPENING

(75) Inventors: Martin Boch, Mannheim (DE); Harald Mueller, Oftersheim (DE); Alexander Wagner, Eppingen/Rohrbach (DE)

(73) Assignees: Deere & Company, Moline, IL (US); AKO Kunststoffe Alfred Kolb GmbH, Sinsheim (DE)

( * ) Notice: Subject to any disclaimer, the term of this patent is extended or adjusted under 35 U.S.C. 154(b) by 69 days.

(21) Appl. No.: 13/821,735

(22) PCT Filed: Sep. 9, 2011

(86) PCT No.: PCT/EP2011/065657
§ 371 (c)(1),
(2), (4) Date: Mar. 8, 2013

(87) PCT Pub. No.: WO2012/032160
PCT Pub. Date: Mar. 15, 2012

(65) Prior Publication Data
US 2013/0160957 A1    Jun. 27, 2013

(30) Foreign Application Priority Data

Sep. 10, 2010  (DE) .......................... 10 2010 040 603

(51) Int. Cl.
*B60J 3/00* (2006.01)
*B60J 1/20* (2006.01)
*B60J 7/00* (2006.01)

(52) U.S. Cl.
CPC .............. *B60J 1/2011* (2013.01); *B60J 7/0015* (2013.01); *B60J 1/2044* (2013.01); *B60J 1/2052* (2013.01)

USPC ...................................... 160/370.22; 160/275

(58) Field of Classification Search
CPC ............................ E04F 10/0655; B60J 1/2044
USPC ............. 160/370.22, 275, 282, 283, 284, 265
See application file for complete search history.

(56) References Cited

U.S. PATENT DOCUMENTS

| | | | | |
|---|---|---|---|---|
| 503,037 | A * | 8/1893 | Crisson | 160/274 |
| 731,774 | A * | 6/1903 | Hagner | 160/284 |
| 5,307,855 | A * | 5/1994 | Martensson, IV | 160/66 |
| 6,086,133 | A * | 7/2000 | Alonso | 296/97.8 |
| 8,281,847 | B2 * | 10/2012 | Uehara et al. | 160/370.22 |
| 8,393,380 | B2 * | 3/2013 | Uehara et al. | 160/370.22 |
| 2005/0241779 | A1 * | 11/2005 | Abouloukme | 160/122 |
| 2013/0153160 | A1 * | 6/2013 | Lin | 160/267.1 |
| 2013/0160957 | A1 * | 6/2013 | Boch et al. | 160/370.22 |

FOREIGN PATENT DOCUMENTS

| | | |
|---|---|---|
| DE | 43 20 393 | 12/1994 |
| DE | 20 2007 018 180 | 4/2008 |
| DE | 10 2008 028 861 | 12/2009 |

OTHER PUBLICATIONS

International Search Report of PCT/EP2011/065657, Dec. 14, 2011.

* cited by examiner

*Primary Examiner* — Blair M Johnson

(57) ABSTRACT

A shading system for a glass-covered vehicle opening includes a pull rod guided between a pair of guide rails. A shading element is attached to the pull rod and is movable between a retracted position and an extended position. Teeth are formed in the guide rails. Gear wheels at opposite ends of the pull rod mesh with the teeth in the guide rails. The pull rod has a gear drive which rotatably couples the gear wheels together.

6 Claims, 4 Drawing Sheets

SHADING DEVICE FOR A GLAZED VEHICLE OPENING

CROSS REFERENCE TO RELATED APPLICATIONS

This application is the National Stage of PCT/EP2011/065657 filed on Sep. 9, 2011, which claims priority under 35 U.S.C. §119 of German Application No. 10 2010 040 603.1 filed on Sep. 10, 2010, the disclosures of which are incorporated by reference. The international application under PCT article 21(2) was not published in English.

FIELD

The present disclosure relates to a shading device for a glazed vehicle opening.

BACKGROUND

It is known to provide a shading device for a glazed vehicle opening having a pull-out bar, which is guided in opposite guide rails, and a shading element, which is mounted on the pull-out bar and which can be adjusted between a retracted position and an extended position by sliding the pull-out bar along the guide rails. A shading device of this kind in the form of a roller sun blind for a vehicle is described in DE 20 2007 018 180 U1, for example. The known roller sun blind comprises a pull-out bar in the form of a pulling hoop guided in opposite guide rails, on which a shading element designed as a roller blind web is mounted. The roller blind web is wound onto a winding shaft preloaded counter to a pull-out direction. In order to be able to lock the roller sun blind in a particular extended position, the frictional forces acting between the pull-out bar and the guide rails must be dimensioned in such a way that they are always greater than the restoring force exerted on the pull-out bar by the preloaded winding shaft via the roller blind web. However, the frictional forces between the pull-out bar and the guide rails decrease over time due to wear, and it is therefore no longer possible to ensure reliable locking, precisely when shocks related to driving occur. Moreover, the pull-out bar tends, if actuated carelessly, to skew in the guide rails and, in the worst case, to jump out of the rails.

SUMMARY

According to an aspect of the present disclosure, a shading device is provided which is improved in terms of its utility and handling. The shading device for a glazed vehicle opening comprises a pull-out bar, which is guided in opposite guide rails, and a shading element, which is mounted on the pull-out bar and which can be adjusted between a retracted position and an extended position by sliding the pull-out bar along the guide rails. According to the invention, the pull-out bar has at least one toothed wheel drive having toothed wheels, which are arranged at opposite ends and which each mesh with a set of teeth formed along the guide rails, wherein the toothed wheels are connected to one another for conjoint rotation.

The glazed vehicle opening can be, in particular, a glass sliding roof or any other vehicle windowpane, e.g. a side window pane provided in a driver's cab of an agricultural vehicle. Accordingly, the guide rails have a horizontal or vertical alignment corresponding to the orientation of the glass sliding roof or of the vehicle windowpane in the installed condition. The guide rails can be either mounted in the open in the edge region of the glazed vehicle opening or can be covered by an interior trim element surrounding the glazed vehicle opening.

It may be noted at this point that the use of the shading device according to the invention is not restricted to glazed vehicle openings; on the contrary, use as a luggage space cover or the like is also conceivable.

Since the toothed wheels of the at least one toothed wheel drive are connected to one another for conjoint rotation, unwanted skewing of the pull-out bar in the guide rails can be largely avoided. By blocking rotation of the toothed wheels, locking of the shading device independently of the frictional forces acting between the pull-out bar and the guide rails is furthermore made possible.

Advantageous developments of the shading device according to the invention will emerge from the dependent claims.

The toothed wheels of the at least one toothed wheel drive are preferably connected to one another for conjoint rotation by a continuous drive shaft extending in the pull-out bar. In this case, the toothed wheels can be mounted in an end region of the drive shaft, which is produced from a suitable steel alloy, and secured by means of an associated cotter pin.

There is furthermore the possibility of the set of teeth extending along an inner edge of a guide groove surrounded by the guide rail. In this case, the set of teeth can be an integral component of the inner edge of the guide groove and can extend as such over the entire adjustment range of the pull-out bar. An inner edge of the guide groove which lies opposite the set of teeth has a smooth profile and thus forms a counter bearing for the toothed wheel rolling along in the guide groove. Both the guide rail and the toothed wheels guided therein can be produced from a suitable plastic, the use of nylon or some other self-lubricating plastics material being suitable for the achievement of low-noise and low-friction running.

A possible tendency for the pull-out bar to skew can be further reduced if the pull-out bar has a first toothed wheel drive and a second toothed wheel drive, which is arranged at a spacing in the direction of adjustment of the pull-out bar. In other words, a first toothed wheel pair is connected for conjoint rotation by means of a first drive shaft and a second toothed wheel pair is connected for conjoint rotation by means of a second drive shaft, wherein the two drive shafts extend parallel to one another in the pull-out bar at a predetermined spacing. The greater the selected spacing between the drive shafts, the less is the tendency of the pull-out bar to skew within the guide rails.

The shading device is designed as a roller sun blind, for example. The roller sun blind can have a shutter-like arrangement of slats arranged flexibly one behind the other, which are guided together with the pull-out bar in the guide rails. However, it is also possible to conceive of an arrangement in which the roller sun blind has a web of textile material and a winding shaft preloaded counter to a pull-out direction for automatically rolling up the web of textile material. The web of textile material is generally a woven synthetic fabric that is opaque or provided with an opaque coating. As a departure from this, the web of textile material can also be produced from a partially translucent woven synthetic gauze or the like.

It is furthermore possible for there to be a manually releasable fixing device for the purpose of locking the at least one toothed wheel drive and hence the pull-out bar guided in the guide rails. In particular, the fixing device has a serrated wheel mounted for conjoint rotation on the drive shaft of the at least one toothed wheel drive and a locking sleeve that can be moved along the drive shaft, wherein the drive shaft is passed through the locking sleeve in a manner which allows it to rotate. Said sleeve comprises end serrations that are complementary to the serrations of the serrated wheel and are in engagement with the serrations of the serrated wheel in such a way, under the action of a preloading force applied by means of a compression spring, that rotation of the serrated wheel and hence of the drive shaft is blocked. An actuating element assigned to the locking sleeve makes it possible to deflect the locking sleeve manually against the preloading force of the compression spring in order to release the fixing device and thus to disengage the end serrations of the locking sleeve from the serrations of the serrated wheel. In this case, rotation of the serrated wheel and hence of the drive shaft is enabled, allowing the pull-out bar to be moved unhindered along the guide rails.

In order to avoid damage to the fixing device or to the at least one toothed wheel drive during the attempt to move the pull-out bar in the locked state, the fixing device is preferably designed as a slip-and-latch safety clutch. For this purpose, the serrations on the end region of the locking sleeve can be shaped in such a way that, when a release torque defined by the preloading force of the compression spring is exceeded, said serrations are lifted out of the serrations of the serrated wheel, allowing rotation of the drive shaft.

DETAILED DESCRIPTION OF THE DRAWINGS

Figure 1:
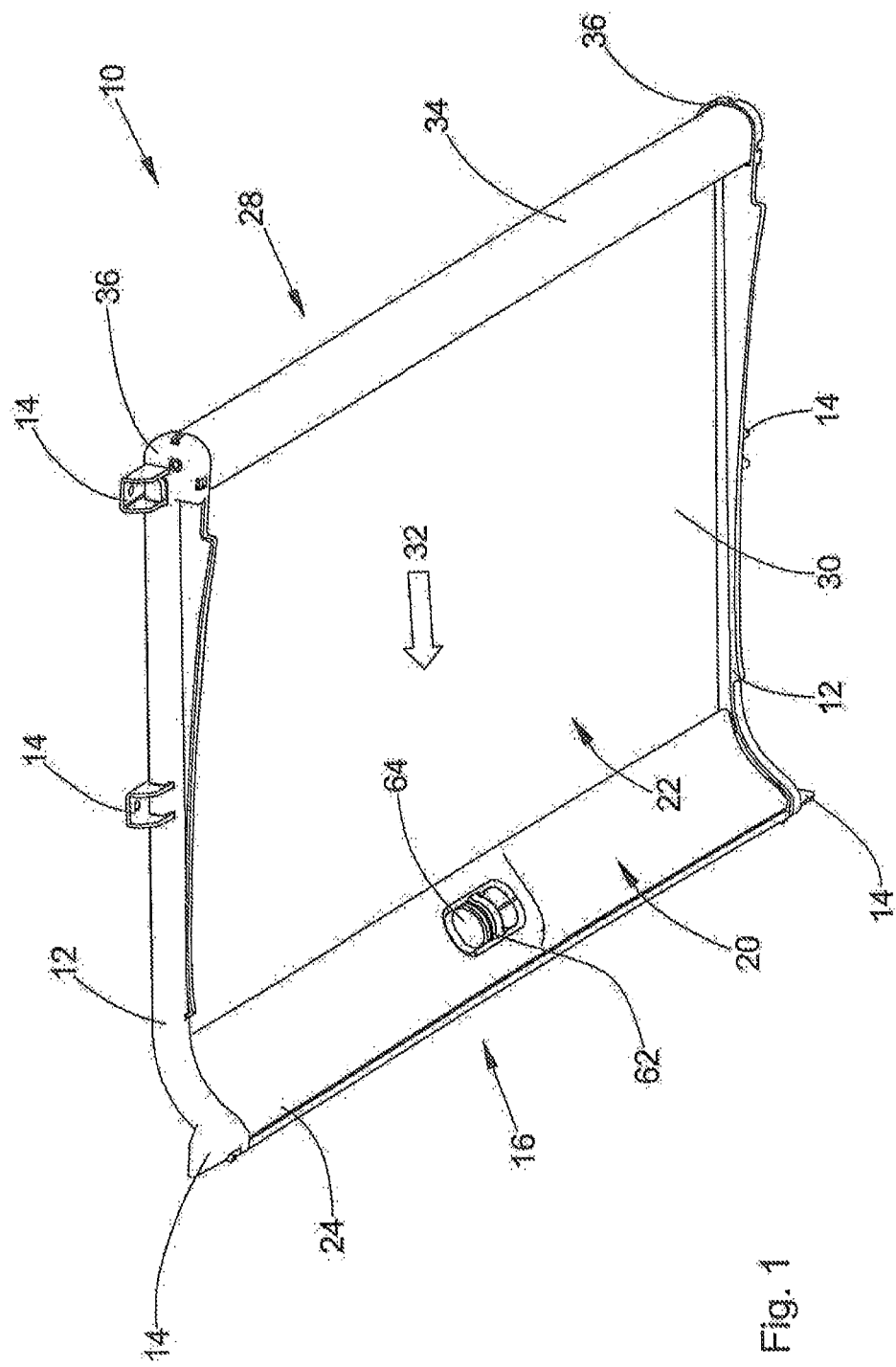
FIG. 1 is a perspective interior view of one illustrative embodiment of the shading device according to the invention.
Figure 2:
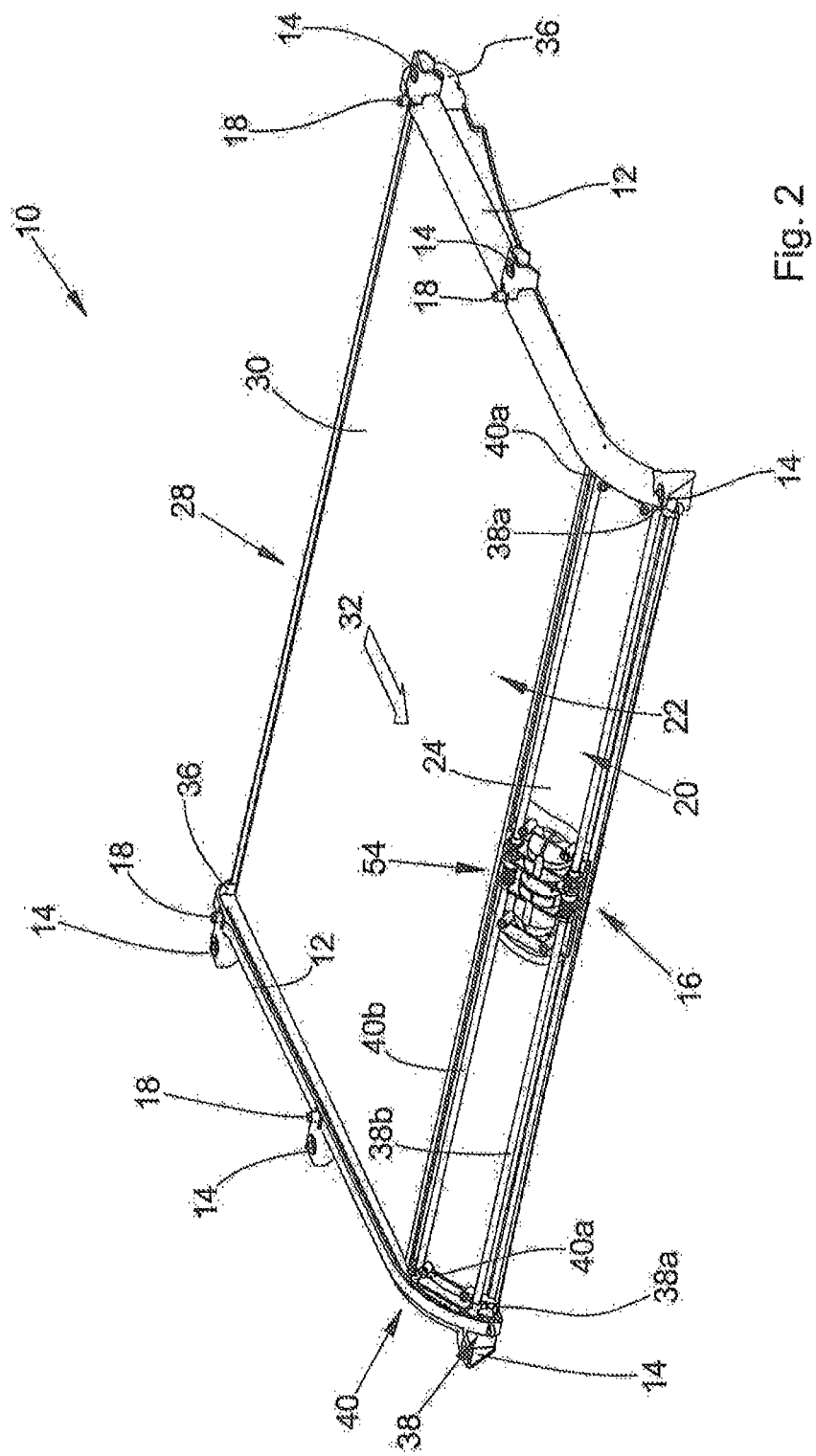
FIG. 2 is a perspective exterior view of the shading device of FIG. 1.

Referring to FIGS. 1 and 2, the shading device 10 comprises a pair of guide rails 12 arranged opposite one another, which can be screwed on by means of associated fastening lugs 14 in the edge region of a glazed vehicle opening, in the present case a glass sliding roof (not shown) of an agricultural vehicle. By way of example, the guide rails 12 have a curved profile matched to the glass sliding roof in a front region 16. A plurality of peg-shaped projections 18 in the region of the fastening lugs 14 serve as positioning aids during the installation of the shading device 10 in the vehicle.

The shading device 10 also includes a pull-out bar 20 guided in the guide rails 12 and a shading element 22 mounted on the pull-out bar 20. The shading element 22 is adjustable between a retracted position and a (fully) extended position illustrated in FIGS. 1 and 2 by sliding the pull-out bar 20 along the guide rails 12. To be more precise, the pull-out bar 20 comprises an inner base part 24 matched to the curved profile of the guide rails 12 and a cover part that can be attached to the base part 24 by means of associated screws 26. For reasons of clarity, the cover part is not shown.

The shading device 10 is designed as a roller sun blind 28. The roller sun blind 28 has a web 30 of textile material and a winding shaft 34 preloaded counter to a pull-out direction 32 for automatically rolling up the web 30 of textile material. The winding shaft 34 is attached at each of its ends to a fastening flange 36 formed on the guide rails 12. The web 30 of textile material is a woven synthetic fabric that is opaque or provided with an opaque coating. As a departure from this, the web 30 of textile material can also be a partially translucent woven synthetic gauze or the like.

The pull-out bar 20 has a first toothed wheel drive 38 and a second toothed wheel drive 40. Each of the two toothed wheel drives 38 and 40 comprises toothed wheels 38a and 40a, which are arranged at opposite ends and which each mesh with a set of teeth 42 formed along the guide rails 12, wherein the toothed wheels 38a, 40a are connected to one another for conjoint rotation by a drive shaft 38b and 40b, respectively, extending in the pull-out bar 20. In other words, a first toothed wheel pair comprising toothed wheels 38a is connected for conjoint rotation by means of a first drive shaft 38b, and a second toothed wheel pair comprising toothed wheels 40a is connected for conjoint rotation by means of a second drive shaft 40b, wherein the two drive shafts 38b and 40b extend parallel to one another in the pull-out bar 20 at a predetermined spacing.

Figure 3:
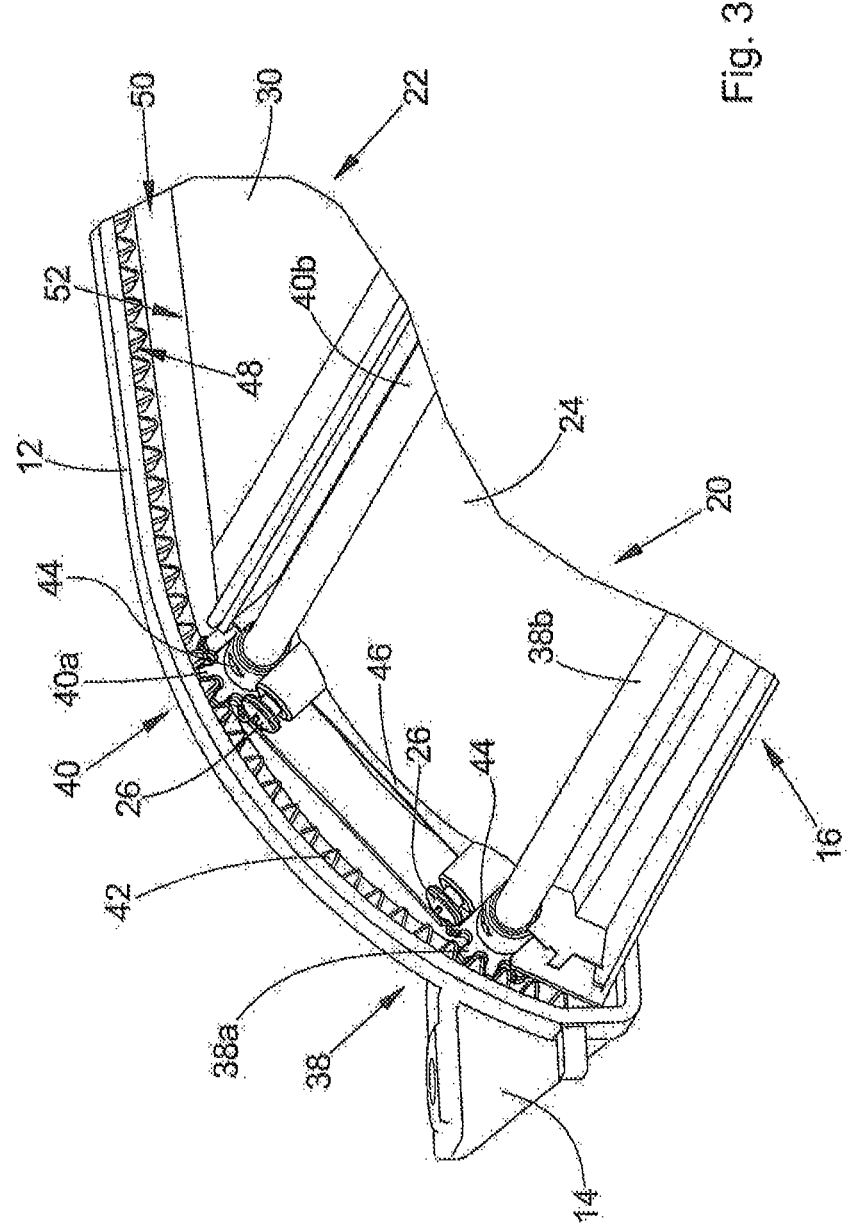
FIG. 3 is a detail view of a toothed wheel drive of the shading device of FIG. 1.

Referring now to FIG. 3, the toothed wheels 38a and 40a are mounted in an end region of the drive shafts 38b and 40b, which are produced from a suitable steel alloy, and secured by means of an associated cotter pin 44. A projection 46 formed integrally on the inner side of the base part 24 serves to provide rotatable support for the drive shafts 38b and 40b and for the toothed wheels 38a and 40a attached thereto. A comparable arrangement is likewise provided on the opposite end of the pull-out bar 20.

By way of example, the set of teeth 42 extends along an inner edge 48 of a guide groove 50 surrounded by the guide rails 12. In this case, the set of teeth 42 is an integral component of the inner edge 48 of the guide groove 50 and extends as such over the entire adjustment range of the pull-out bar 20. An inner edge 52 of the guide groove 50 which lies opposite the set of teeth 42 has a smooth profile and thus forms a counter bearing for the toothed wheels 38a and 40a rolling along in the guide groove 50. Both the guide rails 12 and the toothed wheels 38a and 40a guided therein are produced from nylon or some other self-lubricating plastics material.

Figure 4:
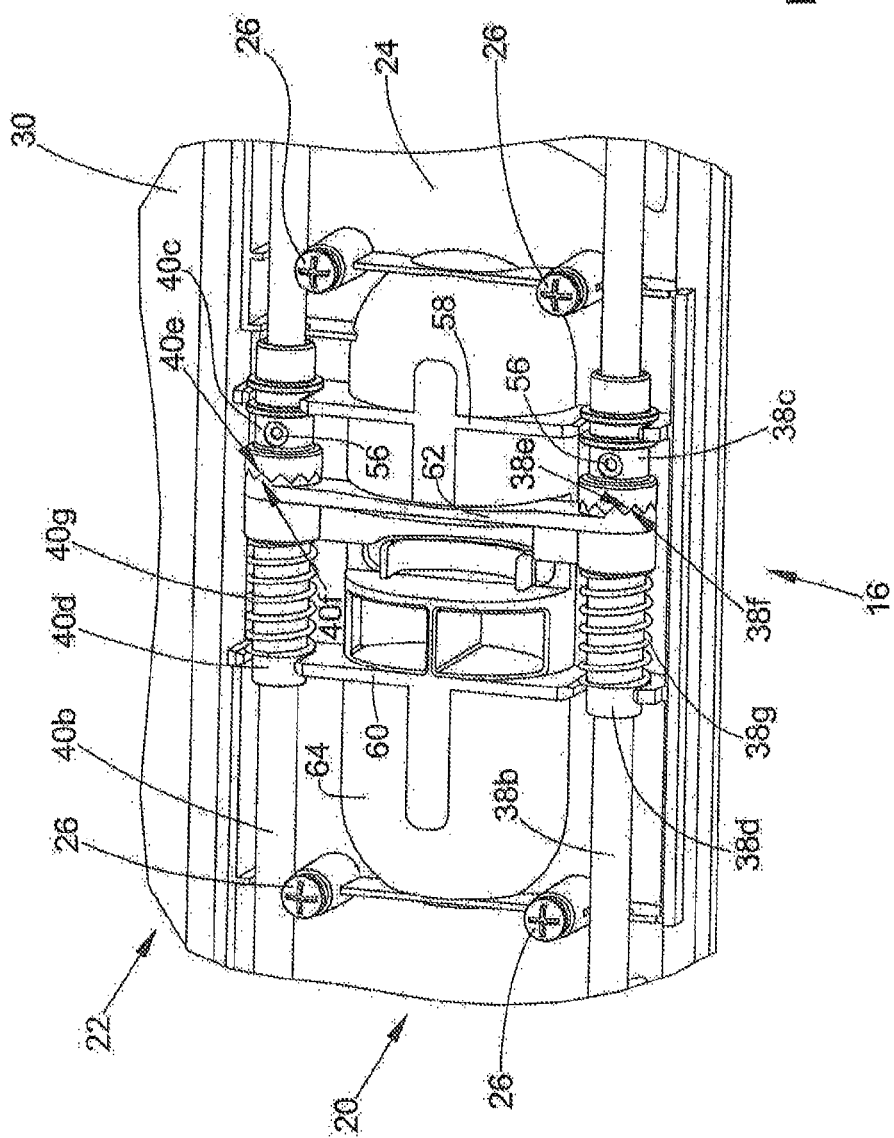
FIG. 4 is a detail view of a fixing device for locking the toothed wheel drive of FIG. 3.

A manually releasable fixing device 54 makes it possible to lock the toothed wheel drives 38 and 40 and hence the pull-out bar 20 guided in the guide rails 12 in any desired extended position. The precise structure of the fixing device 54 is shown in the detail view of FIG. 4. The fixing device 54 has serrated wheels 38c and 40c, which are mounted for conjoint rotation on drive shafts 38b and 40b of the respective toothed wheel drives 38 and 40 by means of associated cotter pins 56, and locking sleeves 38d and 40d that can be moved along the drive shafts 38b and 40b. A projection 58 formed integrally on the inner side of the base part 24 provides rotatable support for the serrated wheels 38c and 40c. The drive shafts 38b and 40b are passed through the locking sleeves 38d and 40d in a manner which allows them to rotate. The sleeves 38d and 40d have end serrations 38e and 40e that are complementary to serrations 38f and 40f of the serrated wheels 38c and 40c and are in engagement with the serrations 38f and 40f of the serrated wheels 38c and 40c in such a way, under the action of a preloading force applied by means of compression springs 38g and 40g, that rotation of the serrated wheels 38c and 40c and hence of the drive shafts 38b and 40b is blocked. The compression springs 38g and 40g are supported on another projection 60, which is formed integrally on the inner side of the base part 24. An actuating element 62 makes it possible to deflect the locking sleeves 38d and 40d manually against the preloading force of the compression springs 38g and 40g in order to release the fixing device 54 and thus to disengage the end serrations 38e and 40e of the locking sleeves 38d and 40d from the serrations 38f and 40f of the serrated wheels 38c and 40c. In this case, rotation of the serrated wheels 38c and 40c and hence of the drive shafts 38*b* and 40*b* is enabled, allowing the pull-out bar 20 to be moved unhindered along the guide rails 12.

The two locking sleeves 38*d* and 40*d* are connected to one another by the actuating element 62, which for this purpose is of bridge-shaped design. The actuating element 62 projects through a grip recess 64 formed in the base part 24 of the pull-out bar 20, allowing access to the bar from outside by the hand.

In order to avoid damage to the fixing device 54 or to the toothed wheel drives 38 and 40 during the attempt to move the pull-out bar 20 in the locked state, the fixing device 54 is preferably designed as a slip-and-latch safety clutch. For this purpose, the serrations 38*e* and 40*e* on the ends of the locking sleeves 38*d* and 40*d* are shaped in such a way that, when a release torque defined by the preloading force of the compression springs 38*g* and 40*g* is exceeded, said serrations are lifted out of the serrations 38*f* and 40*f* of the serrated wheels 38*c* and 40*c*, allowing rotation of the drive shafts 38*b* and 40*b*.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A shading device for a glazed vehicle opening, having a pull-out bar, which is guided between a pair of guide rails, and a shading element, which is mounted on the pull-out bar and which can be adjusted between a retracted position and an extended position by sliding the pull-out bar along the guide rails, wherein:

a set of teeth are formed along the guide rails, and the pull-out bar has a toothed wheel drive having toothed wheels, which are arranged at opposite ends of the pull-out bar, and each of the toothed wheels meshing with the set of teeth, wherein the toothed wheels are connected to one another for conjoint rotation, and the pull-out bar has a first toothed wheel drive and a second toothed wheel drive, which are spaced apart in a direction of adjustment of the pull-out bar.

2. The shading device of claim 1, wherein:
the toothed wheels are connected to one another for conjoint rotation by a continuous drive shaft extending in the pull-out bar.

3. The shading device of claim 1, wherein:
the set of teeth extend along an inner edge of a guide groove surrounded by the guide rail.

4. The shading device of claim 1, wherein:
the device is designed as a roller sun blind.

5. The shading device of claim 1, further comprising:
a manually releasable fixing device for locking the toothed wheel drive.

6. A shading device for a glazed vehicle opening, having a pull-out bar, which is guided between a pair of guide rails, and a shading element, which is mounted on the pull-out bar and which can be adjusted between a retracted position and an extended position by sliding the pull-out bar along the guide rails, wherein:

a set of teeth are formed along the guide rails, and the pull-out bar has a toothed wheel drive having toothed wheels, which are arranged at opposite ends of the pull-out bar, and each of the toothed wheels meshing with the set of teeth, wherein the toothed wheels are connected to one another for conjoint rotation, further comprising a manually releasable fixing device for locking the toothed wheel drive, wherein the fixing device is designed as a slip-and-latch safety clutch.

* * * * *